United States Patent [19]

Jung et al.

[11] Patent Number: 5,717,536
[45] Date of Patent: Feb. 10, 1998

[54] SINGLE-ENDED CASCODE AMPLIFIER FOR MAGNETORESISTIVE SENSORS

[75] Inventors: Peter J. Jung, Eagan; Douglas R. Peterson, Minnetonka, both of Minn.

[73] Assignee: VTC Inc., Bloomington, Minn.

[21] Appl. No.: 530,005

[22] Filed: Sep. 19, 1995

[51] Int. Cl.$^6$ ............................... G11B 5/02; G11B 5/09
[52] U.S. Cl. ............................................ 360/67; 360/46
[58] Field of Search ................................ 360/46, 67, 68

[56] References Cited

U.S. PATENT DOCUMENTS

| | | | |
|---|---|---|---|
| 4,706,138 | 11/1987 | Jove et al. | 360/67 |
| 5,270,882 | 12/1993 | Jove et al. | 360/67 |

OTHER PUBLICATIONS

*Analysis and Design of Analog Integrated Circuits* by P. Grey and R. Meyer, pp. 412 through 421, copyright 1977, printed in U.S.A.

Primary Examiner—Aristotelis M. Psitos
Assistant Examiner—Regina Y. Neal
Attorney, Agent, or Firm—Kinney & Lange, P.A.

[57] ABSTRACT

The present invention is a magnetoresistive element amplifier circuit for amplifying signals produced by a magnetoresistive element. The amplifier circuit includes a gain setting resistor and a first and second transistor. The first transistor has a pair of controlled terminals connected between first and second supply terminals and in series with the magnetoresistive element. The second transistor is connected to the first transistor in a cascode configuration. The second transistor has a pair of controlled terminals connected between the first and second supply terminals and in series with the gain setting resistor. The magnetoresistive element is in a separate DC current path from the gain setting resistor. The first and second transistors provide small signal current through the gain setting resistor for producing gain adjusted output signals.

15 Claims, 2 Drawing Sheets

SINGLE-ENDED CASCODE AMPLIFIER FOR MAGNETORESISTIVE SENSORS

BACKGROUND OF THE INVENTION

This invention relates to disk storage systems which utilize magnetoresistive sensors to read information from a magnetic medium. More particularly, this invention relates to a magnetoresistive head amplifier for amplifying a signal at the magnetoresistive sensor as well as maintaining proper bias current through the magnetoresistive sensor.

Magnetoresistive (MR) sensors or elements are frequently biased by a constant bias current. Changes in resistance of the MR sensor produces a dual polarity small signal voltage across the sensor terminals which usually must be amplified by a suitable amplifier. U.S. Pat. No. 4,706,138 to Jove et al., incorporated herein by reference, discloses a technique whereby the amplified voltage represents $$\Delta R_H/R_h$$

where $R_H$ represents an MR sensor resistance value and $\Delta R_H$ is a change in the MR element resistance, $R_H$, arising from the flux changes encountered by the sensor as information is read from the magnetic medium. This technique is used because stripe height is inversely proportional to sensor resistance and this stripe height varies from sensor to sensor as a result of manufacturing variation as well as wear over the lifetime of the sensor. Therefore, the technique as described above effective cancels this stripe height variation by detecting a signal that is independent of stripe height.

One such magnetoresistive element sensor is described in U.S. Pat. No. 5,270,882 to Jove et al, incorporated herein by reference. The Jove reference discloses an amplifier circuit having a gain setting resistor R1 connected in series with the magnetoresistive sensor RMR between the positive supply B+ and ground GND. The amplifier circuit includes a first and second feedback loop with each of the feedback loops including an operational transconductance (g0 and g1) amplifier. One problem with this configuration is the requirement of the second feedback circuit (g1) which is necessary to provide a significant portion of the DC bias current for the MR sensor RMR. While the Jove reference is operational without this second feedback circuit (g1), if this second feedback circuit is not employed, all of the MR bias current must flow through the gain setting resistor R1. Because the bias current for the magnetoresistive sensor is typically quite large on the order of 10 to 20 milliamps, the value of R1 must be small so that the voltage drop across R1 does not severely limit the head room of the circuit. Because the value of R1 is limited by headroom constraints, the gain of this first stage which is directly related to the size of R1 is also limited in magnitude thereby limiting the noise immunity of this circuit configuration. For low noise operation, the second feedback loop is required. The drawback of the second feedback loop is in addition to the additional cost and complexity of a second operational transconductance amplifier (g1) but also the requirement of a noise bypass capacitor C2. Capacitor C2 for low noise operation must be large and therefore is usually an external capacitor which is undesirable from an additional cost standpoint as well as a manufacturing standpoint.

There is a continuing need for magnetoresistive element amplifiers that have low noise characteristics for use with magnetoresistive MR sensors in disk storage device applications. These amplifiers should be relatively insensitive to variations in stripe height of the MR sensor. In addition, these amplifiers should be capable of operation with a single supply referenced to ground of 5 volts or less. These amplifiers should also be capable of being fully integrated and minimize the use of external devices such as capacitors which are an additional expense, difficult to package as well as difficult to manufacture. These amplifiers should be capable of operation at low noise and be relatively insensitive to supply variation as well as temperature and process variation.

SUMMARY OF THE INVENTION

The present invention is a magnetoresistive amplifier circuit suited for amplifying signals produced by a magnetoresistive sensor. The amplifier circuit has a pair of input terminals for receiving magnetoresistive sensor signals and a pair of output terminals for providing amplified magnetoresistive sensor signals. The amplifier circuit includes a pair of input terminals connected between first and second supply terminals. First and second transistors are included and are connected in a cascode configuration with each of the first and second transistors having a pair of controlled terminals connected between first and second supply terminals. A third transistor is included that has a pair of controlled terminals connected in series with the pair of input terminals between the pair of controlled terminals of the first transistor and the second supply terminal. A first resistor is connected in series between the pair of controlled terminals of the second transistor and the second supply terminal. A pair of output terminals are provided which are connected across the first resistor for providing amplified magnetoresistive sensor signals.

In one preferred embodiment, the magnetoresistive amplifier circuit has a plurality of input terminals and a plurality of transistors each having a pair of controlled terminals connected in series between the pair of controlled terminals of the first transistor and the second supply terminal. Each of the plurality of transistors are connected in series with each of the plurality of input terminals. The amplifier circuit further includes a multiplexing means for selectively providing base drive to each of the plurality of transistors thereby selecting magnetoresistive sensors.

DETAILED DESCRIPTION OF THE PREFERRED EMBODIMENTS

Figure 1:
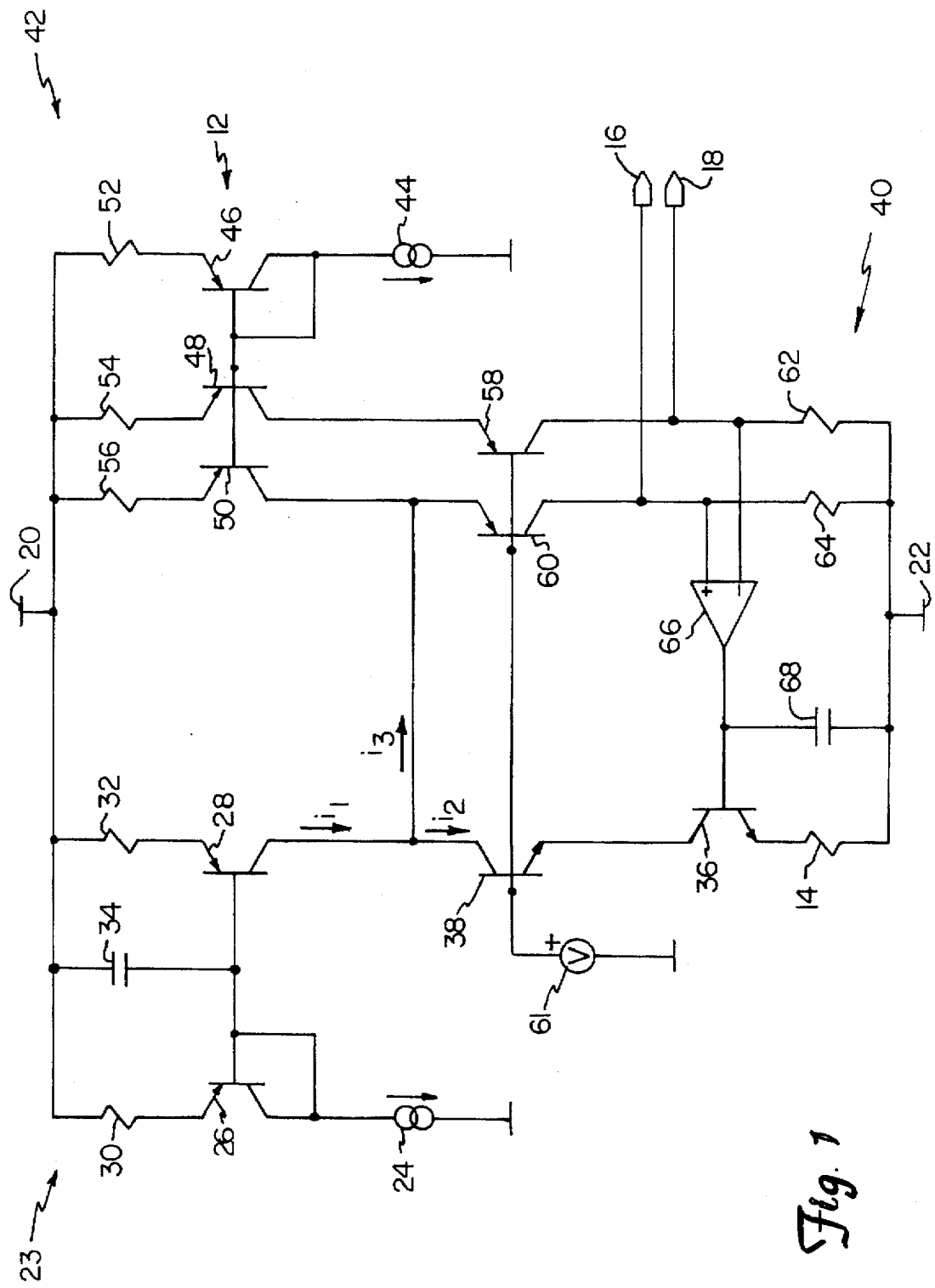
FIG. 1 is a schematic representation of the magnetoresistive sensor amplifier circuit of the present invention.

FIG. 1 shows the magnetoresistive (MR) sensor amplifier circuit 12 of the present invention connected to a magnetoresistive (MR) sensor or element 14. The amplifier circuit 12 amplifies an MR sensor signal provided by the MR sensor 14 and produces a gain adjusted MR sensor signal at output terminals 16 and 18. The amplifier circuit 12 is provided a supply voltage across a pair of supply terminals 20 and 22. In one preferred embodiment, the supply voltage is equal to 5 volts with supply terminal 20 being positive relative to supply terminal 22.

Bias current is provided to the MR sensor by a current mirror circuit 23 which includes a current source 24, transistors 26 and 28, resistors 30 and 32 and capacitor 34. The current mirror provides bias current to the MR sensor 14 by way of transistors 36 and 38. The current mirror 23 is a conventional current mirror for providing a specified bias current in the MR sensor 14. This bias current tends to be constant over temperature.

The bias current provided by the current mirror 23 is passed on by transistor 38 to transistor 36. Transistor 36 is controlled by a bias control circuit 40 to maintain the desired bias current in the MR sensor 14. The bias control circuit 40 includes a current mirror circuit 42. The current mirror circuit 42 includes a current source 44, transistors 46, 48, and 50, resistors 52, 54, and 56. Also included in the bias control circuit 40 are transistors 58 and 60, resistors 62 and 64, amplifier 66 and capacitor 68. The current mirror 42 provides matched currents through transistors 58 and 60 to matched resistors 62 and 64.

Current error results from an imbalance in the MR amplifier circuit 12 between the collectors, of transistors 28 and 38; this current error is also reflected in the collector current of transistor 60 as well as in the voltage across resistor 64. This voltage across resistor 64 due to current error is not canceled by the voltage across resistor 62 and thus produces a differential or offset voltage at the output terminals 16 and 18 of the MR amplifier circuit 12. This offset voltage is provided to the feedback transconductance amplifier 66 which provides base drive to a base terminal of transistor 36 to eliminate these low frequency differential voltages at the output terminals 16 and 18.

MR sensor signals appearing across the MR sensor 14 are transferred by cascode configured transistors 36 and 38 through transistor 60 to a current path through resistor 64. The MR sensor signal appearing across resistor 64 is amplified or gain adjusted by the input transistor 36. This amplified MR signal is provided to output terminals 16 and 18. Bias voltage is provided to transistors 38, 58 and 60 by a conventional bias voltage source 61. The gain of the MR sensor signal between the MR sensor 14 and the amplifier output terminals 16 and 18 is related to the resistance of the MR sensor 14. Since the MR sensor signal is proportional to its resistance and the gain of the amplifier is inversely proportional to the MR sensor resistance then the $$\Delta R/R$$

sensing is accomplished by the MR amplifier circuit 12 of the present invention. Therefore, the MR amplifier circuit 12 of the present invention provides an amplifier output voltage that tends to be insensitive to stripe height variation which is an important aspect of the present invention.

An important aspect of the MR amplifier circuit 12 of the present invention is that the gain setting resistor 64 for the MR amplifier circuit 12 is not in the same current path as the MR sensor 14 so that the voltage across resistor 64 does not subtract from the head room in the current path through the MR sensor 14. This configuration allows the amplifier circuit to provide high gain without requiring the use of more than one feedback amplifier. In addition, the feedback amplifier 66 used in the MR amplifier circuit 12 is referenced to voltages that are across resistors 62 and 64 which are referenced to the ground terminal 22. Therefore, the voltages across resistors 62 and 64 which are applied to the feedback circuit are relatively insensitive to variations in the positive supply voltage at supply terminal 20.

The MR amplifier circuit 12 will now be described in greater detail. The current mirror circuit 23 includes a current source 24 which provides a constant current through diode connected transistor 26 producing a forward biased voltage drop between the emitter and base of transistor 26. In the preferred embodiment, current source 24 is a voltage-to-current converter having a reference voltage provided by a band-gap referenced voltage source and applied to an external resistor. This forward biased voltage drop across transistor 26 forward biases the emitter base junction of PNP transistor 28 to establish a collector current in transistor 28. Resistors 30 and 32 are selected in addition to the sizing of the emitter base areas of transistors 26 and 28 such that the proper bias current for MR sensor 14 is provided at the collector of transistor 28. Capacitor 34 is provided to bypass any noise associated with current source 24. Capacitor 34 is selected to provide a passband having a low frequency corner of 100 kHz. Therefore, capacitor 34 is large and typically an external capacitor.

Current mirror 42 is similar to current mirror 23 except that instead of providing a single mirror current as in current mirror 23, the current mirror circuit 42 provides a pair of matched mirror currents at the collectors of transistors 48 and 50. The current source 44 provides a collector current in the diode connected transistor 46 thereby establishing a forward bias voltage drop between the emitter and base of transistor 46. This forward bias voltage drop together with the voltage drop across resistor 52 is provided across the emitter base junctions of each of transistors 48 and 50. The collector currents in transistors 48 and 50 are determined by the mirror ratio between these collector currents and the collector current of transistor 46. As discussed with respect to current mirror 23, the mirror ratio is selected by the resistor ratios of resistors 52, 54 and 56 as well as the emitter areas of transistors 46, 48 and 50. Resistors 54 and 56 are matched resistors as well as the emitter area of transistors 48 and 50 are matched so that the collector currents of transistors 48 and 50 are identical.

The bias control circuit 40 controls the bias current in the MR sensor 14 by controlling the base voltage of transistor 36. The current mirror 42 provides identical collector currents in transistors 48 and 50 which are provided to matched resistors 62 and 64 by transistors 58 and 60, respectively. The current source 44 is compensated to provide a constant voltage drop across resistor 62 and 64 over temperature and process variation. The transconductance feedback amplifier 66 provides an output current that is related to the differences in voltages across resistors 62 and 64. Because these resistors are matched and the current through them are the same under a balanced condition, the voltages across these resistors will be the same. Therefore, in a balanced condition, the voltages across resistors 62 and 64 will be equal and there is zero offset presented to the input of feedback amplifier 66. In a balanced condition, the mirror current provided by the collector of transistor 28 is equal to the bias current for the MR sensor 14. In this balanced condition, the voltages across resistors 62 and 64 are equal and the offset voltage provided to the feedback amplifier 66 is zero. Capacitor 68 attenuates or "rolls-off" the response of the feedback transconductance amplifier 66 to allow the amplifier circuit 12 to respond to the MR sensor signals which are small signal fluctuations having a frequency greater than 100 kilohertz.

However, during mode transitions from write or idle mode to read mode where the MR sensor 14 is used to read information from magnetic media, the current mirrors 23 and 42 must transition from not providing mirror current to providing mirror current. During this transition, capacitor 68 requires time to charge to an operating point. During this transition, the collector current of transistor 28 labeled $I_1$ is not identical to the collector current of transistor 38 labeled $I_2$. In this condition, an imbalance occurs providing an error current or imbalance current labeled $I_3$ that is provided to the emitter of transistor 60. This error current $I_3$ produces an imbalance in the collector currents between transistors 58 and 60 thereby producing an imbalance in voltages across resistors 62 and 64. This imbalance in voltage drops across resistors 62 and 64 produces a positive or offset error voltage at the input of feedback amplifier 66 which produces an output current which tends to increase the voltage at the base terminal of transistor 36 thereby tending to increase the collector current of transistor 36 thereby reducing the error current $I_3$.

Conversely, when a negative error or offset voltage is produced at the input of the feedback amplifier 66, the voltage at the base terminal of transistor 36 is reduced tending to reduce the MR sensor current tending to increase the error current. The bias control circuit 40 utilizes this feedback technique to maintain a constant bias current through MR sensor 14. Another function performed by the MR amplifier circuit 12 of the present invention is to amplify the MR signal produced by the MR sensor 14 and provide this amplified or gain adjusted MR signal at output terminals 16 and 18. The MR sensor 14 as discussed previously, is biased with a constant bias current. Relative movement between the MR sensor 14 and the magnetic media as in the case of a read operation, produces changes in magnitude and/or polarity or a magnetic field encountered by the sensor. These changes in the magnetic field produce slight changes in the resistance of the MR sensor 14. In a typical MR sensor 14, the resistance changes in both a positive and negative direction by approximately 1% producing an MR sensor signal. This MR sensor signal has a frequency that is related to the rate of magnetic flux transversals the MR sensor 14 encounters. The MR sensor signal has both positive and negative polarities.

The MR sensor signal produces a small signal at the emitter terminal of transistor 36. The small signal provided to the emitter of transistor 36. The gain of transistor 36 is suppressed by the cascoded transistor 38. In addition, the capacitance of capacitor 68 presents a low impedance at small signal frequencies greater than 100 KHZ so that transistor 36 acts as a common base amplifier. Transistor 38 which is cascode connected with transistor 36 tends to suppress the gain of transistor 36 thus eliminating the Miller multiplication of the base to collector capacitance of transistor 36. The small signal produced by the MR sensor 14 is transferred from the collector of transistor 36 to the emitter of transistor 38. The low impedance of transistor 60 tends to suppress the gain of transistor 38 and the small signal is transferred form the emitter of transistor 38 to the collector of transistor 38 as well as to the emitter of transistor 60 and the collector of transistor 50. Because the collectors of transistors 50 and 28 represent a relatively high impedance, the small signal will be presented to the emitter of transistor 60.

Because the small signal gain is suppressed in transistors 36 and 38, the small signal gain at the collector of transistor 60 will be equal to the resistance of resistor 64 divided by the sum of the resistance of the MR sensor 14 plus the small signal impedance of the emitter base junction of transistor 36. The small signal impedance of the emitter base junction, $r_e$, of transistor 36 is equal to $$r_e = 1/g_m$$

where $g_m$ is determined from the collector current of the device. The $r_e$ of transistor 36 is on the order of two ohms and the resistance of the MR sensor 14 is typically on the order of 10 to 40 ohms. Therefore, the small signal gain can be approximated as simply the resistance of resistor 64 divided by the resistance of the MR sensor 14. As discussed previously, it is desirable that the small signal gain be proportional to the MR sensor resistance in order to achieve $$\Delta R/R$$

sensing for optimum stripe height immunity in the small signal. The small signal generated by the MR sensor 14 is proportional to its change in resistance, $\Delta R$, and the gain of the amplifier is inversely proportional to its resistance $$1/R$$

then the $$\Delta R/R$$

sensing as taught in U.S. Pat. No. 4,706,138 is achieved. The small signal response of the cascode connected transistors is described in chapter 7 of *Analysis and Design of Analog Integrated Circuits*, by John Wiley and Sons Inc. (1977).

Capacitor 68 serves as a loop compensation capacitor for the transconductance amplifier 66 as discussed previously. In addition, capacitor 68 also acts as a bypass capacitor to bypass any noise presented to the small signal input at the base of transistor 36.

The small signal provided by the MR sensor as discussed previously is amplified and provided as a voltage across resistor 64. Therefore, the voltage across the output terminals 16 and 18 is the difference between the voltage across resistor 64 and the voltage across resistor 62. The voltage across resistor 62 represents only the DC bias voltage and does not represent any small signal voltage. Therefore, the voltage across the output terminals 16 and 18 represents only the small signal component of the voltage across resistor 64 because the bias component is effectively canceled by the bias voltage component across resistor 62. Therefore, the voltage across output terminals 16 and 18 is a differential voltage that is gain adjusted and represents the small signal voltage at the MR sensor 14.

Figure 2:
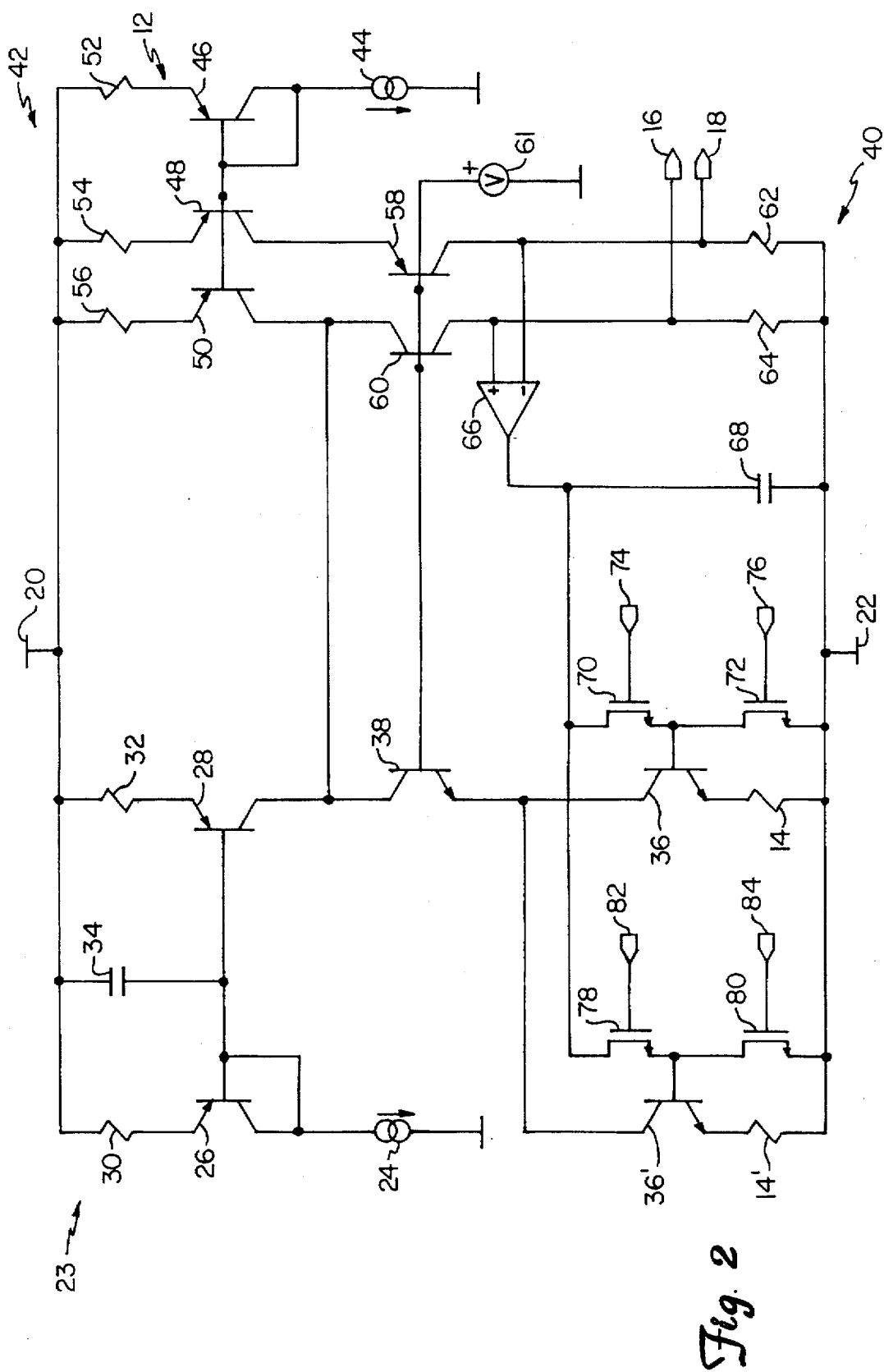
FIG. 2 is a schematic representation of a preferred embodiment of the magnetoresistive element amplifier circuit having a plurality of magnetoresistive sensors at the input of the amplifier.

FIG. 2 shows the MR amplifier circuit 12 of the present invention connected to a plurality of MR sensors each of which can individually be selected to provide an MR sensor signal. Similar element numbering is used in FIG. 2 to identify similar elements previously described in FIG. 1.

The MR amplifier circuit 12 shown in FIG. 2 is identical to the MR amplifier circuit 12 shown in FIG. 1. This MR amplifier circuit includes a current mirror 23 which includes current source 24, transistors 26 and 28, resistors 30 and 32 and a capacitor 34. The current mirror 23 provides bias current to the MR element 14 as described in FIG. 1.

A second current mirror 42 which includes current source 44, transistors 46, 48 and 50, resistors 52, 54 and 56 provides matched bias currents to each of resistors 62 and 64 in the same manner as described in FIG. 1.

Also included in FIG. 2 is a feedback amplifier 66 and capacitor 68 for controlling bias current in the MR sensor. In addition, a cascode configured transistor pair 36 and 38 are provided for providing the MR sensor signal through transistor 60 across resistor 64 so that $$\Delta R/R$$

sensing is achieved at the output terminals 16 and 18 as discussed in FIG. 1.

FIG. 2 shows transistor 36 and MR sensor 14 connected in series between the emitter of transistor 38 and the supply terminal 22 as shown in FIG. 1. FIG. 2 shows an additional transistor 36' and a second MR sensor 14' which is also connected in series between the emitter of transistor 38 and the supply terminal 22. Transistors 70 and 72 allow MR sensor 14 to be selected as an input to the amplifier circuit. When MR sensor 14 is selected, a signal is provided so that transistor 70 is in a conducting mode and a signal is provided to terminal 76 so that transistor 72 is a nonconducting mode. Conversely, if MR sensor 14 is not selected, a signal is provided at terminal 74 to drive transistor 70 to a nonconducting mode and a signal is provided at terminal 76 to drive transistor 72 to a conducting mode. Transistor 72 is driven to a conducting mode in the unselected head to minimize channel crosstalk.

In a similar manner, MR sensor 14' is either selected or unselected by applying proper signals at terminals 82 and 84 to drive transistors 78 and 80 into either a nonconducting or conducting mode.

In the preferred embodiment, transistors 70 and 78 are configured to minimized resistance to minimize noise. In a typical application, an MR sensor 14 is used for each surface of the rotating disk, i.e. top and bottom surface of the disk. Therefore, if more than one disk is used in the disk drive, then additional pairs of MR sensors can be connected in parallel between the emitter of transistor 38 and supply terminal 22. Typically, only a single MR sensor is selected at a time to read information from only one side of the disk surface at a time.

As discussed previously, capacitor 68 is a large capacitor that frequently must be an external capacitor. Connecting the base terminal of the transistor corresponding to the selected MR sensor also connects the base terminal to capacitor 68. Therefore, only one capacitor 68 is required no matter how many MR sensors 14 and 14' are used.

Although the present invention has been described with reference to preferred embodiments, workers skilled in the art will recognize that changes may be made in form and detail without departing from the spirit and scope of the invention.

What is claimed is:

1. A magnetoresistive amplifier circuit suited for amplifying signals produced by a magnetoresistive sensor, the amplifier circuit having a pair of input terminals for receiving magnetoresistive sensor signals and a pair of output terminals for providing amplified magnetoresistive sensor signals, the amplifier circuit comprising:
    a pair of input terminals connected between first and second supply terminals;
    first and second transistors connected in a cascode configuration with each of the first and second transistors having a pair of controlled terminals connected between first and second supply terminals;
    a third transistor having a pair of controlled terminals connected in series with the pair of input terminals between the pair of controlled terminals of the first transistor and the second supply terminal;
    a first resistor connected in series between the pair of controlled terminals of the second transistor and the second supply terminal; and
    a pair of output terminals connected across the first resistor.

2. The amplifier circuit of claim 1 wherein the first and second transistors each include a control terminal with the control terminal of the first transistor being connected to the control terminal of the second transistor and with the controlled terminal of the first transistor being connected to the controlled terminal of the second transistor.

3. The amplifier circuit of claim 1 further including:
    a fourth transistor having a pair of controlled terminals connected between the first and second supply terminals and a control terminal connected to the control terminal of each of the first and second transistors;
    a second resistor connected in series between the pair of controlled terminals of the fourth transistor and the second supply terminal; and
    first and second matched current sources with the first current source connected between the first supply terminal and the controlled terminals of the second transistor and the second current source connected between the first supply terminal and the controlled terminals of the fourth transistor.

4. The amplifier circuit of claim 3 wherein the pair of output terminals are connected across the series connection of the first and second resistors.

5. The amplifier circuit of claim 3 further including a differential amplifier having a pair of differential input terminals and an output terminal for providing an output signal based on differential input signals, each of the pair of differential input terminals being connected to each of the output terminals of the amplifier circuit and with the output terminal of the differential amplifier being connected to a control terminal of the third transistor, the differential amplifier providing a low frequency component of differential input signals to the control terminal of the third transistor.

6. The amplifier circuit of claim 1 further including a current source connected between the first supply terminal and the controlled terminals of the first transistor.

7. The amplifier circuit of claim 1 wherein the pair of input terminals are a plurality of input terminals and wherein the third transistor is a plurality of transistors with each of the plurality of transistor connected in series with each of the plurality of input terminals, the amplifier circuit further including a multiplexing means for selectively providing base drive to each of the plurality of transistors for selecting magnetoresistive sensors.

8. A magnetoresistive amplifier circuit for amplifying signals produced by a magnetoresistive sensor, the amplifier circuit having a pair of input terminals for receiving magnetoresistive sensor signals and a pair of output terminals for providing amplified magnetoresistive sensor signals, a first transistor having a pair of controlled terminals connected in series with the pair of input terminals between first and second supply terminals, one of the pair of input terminals being connected to one of the first and second supply terminals so as to be maintained in a substantially constant voltage relationship with respect thereto, the magnetoresistive amplifier further including:
    a second transistor having a control terminal and a pair of controlled terminals, the pair of controlled terminals of the second transistor being connected in a first current path in series with the pair of input terminals; and
    a third transistor having a pair of controlled terminals connected between the pair of supply terminals in a second current path separate from the first current path, the second and third transistors providing small signal current changes in the second current path that are substantially equal to small signal current changes in the first current path whereby small signal current changes in the second current path produce amplified magnetoresistive sensor signals at the pair of output terminals.

9. The amplifier circuit of claim 8 wherein the second and third transistors are connected in a cascode configuration.

10. The amplifier circuit of claim 8 further including a resistor connected in the second current path and with the pair of output terminals being connected across the resistor.

11. The amplifier circuit of claim 8 further including a feedback circuit connected to the pair of output terminals for cancelling low frequency current changes in the first current path.

12. A magnetoresistive element amplifier circuit for amplifying signals produced by a magnetoresistive element, the amplifier circuit having a pair of input terminals and a pair of output terminals, the amplifier circuit comprising:

a gain setting resistor;

a first transistor having a pair of controlled terminals connected between first and second supply terminals in series with the pair of input terminals;

a second transistor connected to the first transistor in a connection configuration which includes transistors connected in a cascode interconnection, the second transistor having a pair of controlled terminals connected between the first and second supply terminals in series with the gain setting resistor, the pair of input terminals being in a separate current path from the gain setting resistor with one thereof being connected to one of the first and second supply terminals so as to be maintainable in a substantially constant voltage relationship with respect thereto, the first and second transistors providing current through the gain setting resistor for producing amplified output signals at the output terminals.

13. A magnetoresistive element amplifier circuit for receiving signals produced by a magnetoresistive element and producing gain adjusted output signals, the amplifier circuit comprising:

a first current path for providing current between first and second supply terminals and a pair of input terminals suited for connection to a magnetoresistive element;

a gain setting element;

a second current path for providing current between first and second supply terminals and through the gain setting element with the first current path being separate from the second current path; and a small signal low impedance path connected between the first and second current paths for producing current changes in the second current path corresponding to resistivity changes in the magnetoresistive element with current changes in the second current path producing voltage changes at a pair of output terminals connected across the gain setting element.

14. The amplifier circuit of claim 13 wherein the amplifier circuit is configured to provide a voltage gain between pairs of input and output terminals that is proportional to the resistance of the gain setting element.

15. A magnetoresistive element amplifier circuit for amplifying signals produced by a magnetoresistive element, the amplifier circuit comprising:

a first current path for providing current between first and second supply terminals and a pair of input terminals configured for connection to a magnetoresistive element;

a controlled element connected in series with the pair of input terminals for controlling current in the first current path;

a control element operatively connected to the controlled element; and a second current path for providing current between first and second supply terminals and through the control element with the first current path being separate from the second current path and with the control element controlling low frequency current changes in the first current path based on current in the second current path.

* * * * *

UNITED STATES PATENT AND TRADEMARK OFFICE
CERTIFICATE OF CORRECTION

PATENT NO. : 5,717,536
DATED : FEBRUARY 10, 1998
INVENTOR(S) : PETER J. JUNG, DOUGLAS R. PETERSON

It is certified that error appears in the above-identified patent and that said Letters Patent is hereby corrected as shown below:

Col. 5, line 64, delete the following formula:

$$r_e - 1/g_m$$

insert the following formula:

$$--r_e = \frac{1}{g_m}--$$

Signed and Sealed this

First Day of December, 1998

Attest:

BRUCE LEHMAN

*Attesting Officer*      *Commissioner of Patents and Trademarks*